Nov. 5, 1940.    G. S. AVERY, JR    2,220,505
GROWTH CONTROL
Filed May 22, 1940
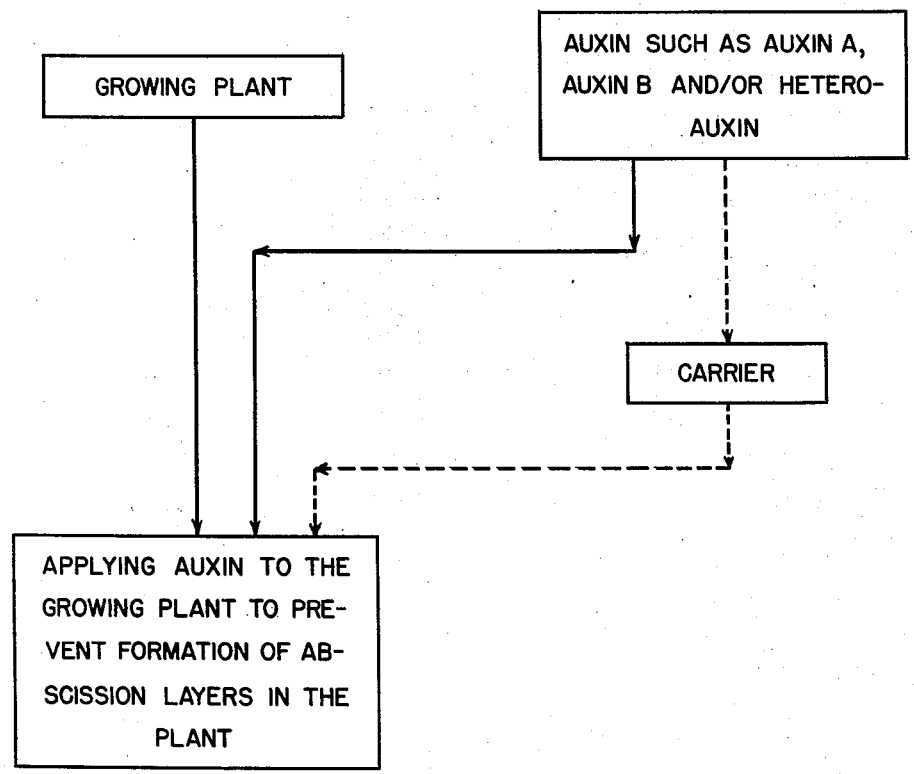
Inventor
GEORGE S. AVERY JR.
By Semmes, Keegin & Semmes
Attorneys Patented Nov. 5, 1940

2,220,505

UNITED STATES PATENT OFFICE 2,220,505

GROWTH CONTROL

George S. Avery, Jr., New London, Conn.; dedicated, by mesne assignments, to the Government and People of the United States and Territories Application May 22, 1940, Serial No. 336,658

10 Claims. (Cl. 47—58)

This invention is hereby dedicated to the public for the use of any person in the United States, without the payment by him of any royalty thereon.

My invention relates to the regulation of plant growth. The present application is a continuation-in-part of my copending application Serial No. 104,543, filed October 7, 1936.

Not only does it relate to the regulation of plant growth in general, but particularly to the regulation of the formation of abscission tissue. At various stages in the growth of plants abscission layers tend to form and this can be controlled and damage prevented if an auxin is applied to the plants sufficiently in advance of this period. For example, it has been found that, where the temperature in the winter time does not fall to a necessary minimum, there often occurs a failure of the buds to develop in certain varieties; sometimes there is actual abscission of buds on trees such as apricots and peaches. The prevention of bud failure, or the prevention of abscission, is very important in view of large losses suffered annually by the fruit grower.

Furthermore, this invention has utility in preventing abscission of flower buds on herbaceous plants, such as greenhouse grown sweet peas. In the winter time, sweet peas and other varieties often suffer from abscission of the flower buds.

In addition to the prevention of bud abscission, the control of the formation of the abscission layer also prevents leaf drop and fruit drop.

The single sheet of drawings shows a diagrammatic representation of my invention.

According to the present invention, the growth of vegetable tissue, and particularly the development of an abscission layer, is regulated by applying an auxin to the trunk, branches, leaves, buds, flowers, or fruits of growing plants. Either spray or dusting technique may be employed in making the application. The use of sprays has been found particularly satisfactory, a simple solution or dispersion of the auxin being adequate for this purpose.

The auxins employed are either auxin A, auxin B, heteroauxin (3-indoleacetic acid), or similar plan auxins; they may be used either in the chemically pure form, or as an impure plant extract, or an impure extract from urine or other animal materials.

The term "auxin" is limited to those substances which cause an enlargement of the plant cell as distinguished from those substances that cause plant growth by supplying nutrient to the plant. In addition to auxin A and B and heteroauxin, the influence of acids, such as naphthalene acetic, 3-indole butyric, 2-carboxy-3-indole butyric, indole propionic, phenylacetic, fluorene acetic, anthracene acetic, and naphthyl acetonitrile, upon plant cell enlargement is well known. The term "auxin" in the claims is inclusive of the substances disclosed above as well as other and related materials capable of exerting the desired action upon plant growth, particularly those containing a naphthalene, naphthalenoxy, phenyl, phenoxy, indole, and other aromatic and aromaticoxy groupings as well as the ethers, esters, amides, and substitution products of the acid derivatives heretofore mentioned. The term does not include substances which are merely plant stimulants or substances, such as ammonia or ethylene, which have undesirable volatility.

In carrying out the invention, the auxin material is applied to the plant surface at a time, usually from one day to two weeks in advance of the period when a part of the plant would normally be expected to absciss. The auxin can be applied as a spray by simply dissolving or dispersing the required amount of auxin in water. This may be accomplished either by adding the auxin, a solution thereof in water miscible organic solvent, or a water soluble salt of the auxin to the required amount of water to obtain a solution or dispersion of the active material. Similarly the auxin may be incorporated into dust compositions, any of the common finely divided carriers being suitable provided they do not react with or on the auxin so as to destroy its effectiveness.

In one preferred embodiment of the invention, it has been found that if an auxin is employed with a carrier which will hold the auxin in contact with the plant so that it can take effect and give it up slowly to the plant, some remarkable results are obtained. This embodiment of the invention, relating to the use of carriers of this type, is not dedicated to the public, but is claimed in my co-pending application Serial No. 337,111, filed May 23, 1940.

If it be desired to hold the auxins in contact with the plants, a carrier may be used which forms a coating on the plants. The carrier may be in the form of a protective colloid. The carrier and auxin mixed together may be applied to the plants by dipping, but preferably by spraying. Good results are obtained by such treatment of the plants in promoting growth. Particularly the prevention of bud drop (abscission) is important, and it has been found that the trees or other plants must be treated well before the time at which the buds would normally be expected to open.

As a carrier for the auxin an aqueous emulsion consisting of wax and a colloidal earth may be employed, whereby a permeable film is formed. The auxins are given up slowly to the plant and are prevented from being washed away by rains at such a rapid rate as to prevent their desired action. The colloidal earth is made into a suspension in hot water and molten wax is added to the mixture when the latter is at a temperature which is above that of the melting point of the wax. The wax is added with constant stirring and a good emulsion is obtained. After cooling the emulsion, the auxins are added and the material is then in condition for being sprayed on the plants.

A good spray can be obtained by employing approximately 3 parts of colloidal earth, 20 parts of water, 10 parts of wax and 3 parts of the ammonium salt of a drying acid and diluting the whole with approximately 80 parts of water. A very good carrier can be formed of 6 parts by weight of paraffin wax, 4 parts by weight of beeswax, 3 parts of a colloidal earth, 3 parts of the ammonium salt of a drying acid and 10 to 15 parts of water. The term "ammonium salt of a drying acid" refers to unsaturated fatty acids having two or more double bonds in the structural formula. These fatty acids may be derived from drying oils, such as fish oil, soya bean oil, lumbang, sardine, linseed, perilla, tung and so forth. The colloidal earth may be fuller's earth or similar diatomaceous clays, but preferably bentonite.

To obtain the composition the ammonium salt of the drying acid is dissolved in hot water; the suspension of a colloidal earth in hot water is accomplished separately; the solution and the suspension then are mixed, and to this mixture is added the molten wax at a temperature above that of the melting point of the wax. Constant stirring should take place until a good emulsion is formed, and this should continue until the mixture is cool. The auxin may be then added, though since most auxins are heat stable they can be added before the cooling.

The wax employed is preferably paraffin wax, but others can be used, such as carnauba, beeswax, etc.

Another example of a mixture which I have found to be an excellent one is one employing ammonium linoleate by weight 3 parts disssolved in 50 parts of hot water. Three parts of bentonite is made into a suspension with 50 parts of the hot water. The solution and the suspension are then added together and while the mixture is above the melting point of paraffin, 10 parts of molten paraffin are poured into the mixture with vigorous stirring, and the emulsion allowed then to cool to room temperatures while continuously stirring.

At this point auxin may be added in the equivalent of a concentration of one to 300,000 parts by weight of the carrier. This figure is not meant to be limiting, but I have found that too high a concentration of the auxin is undesirable.

While certain embodiments of my invention have been disclosed, it is to be understood that I am to be limited only by the appended claims and the showing of the prior art, and that I am entitled to the equivalents of the steps taken and the substances used.

I claim:

1. A method of preventing the abscission of a part of a growing plant comprising treating the plant with an auxin at a time in advance of the period when the part might be expected to be abscised.

2. A method of preventing the abscission of a part of a growing plant comprising treating the part of the plant which is expected to absciss with an auxin at a time substantially in advance of the period when the part might be expected to be abscised so as to prevent the abscission of the treated part of the plant.

3. A method of preventing the abscission of a part of a growing plant comprising treating the plant with an auxin at a time substantially in advance of the period when the part might be expected to be abscised so as to prevent the abscission of a part of the plant.

4. A method of preventing the abscission of a part of a growing plant comprising treating the plant with an auxin, which is substantially non-volatile at normal temperatures, at a time substantially in advance of the period when the part might be expected to be abscised so as to prevent the abscission of a part of the plant.

5. A method of preventing abscission of buds comprising treating plants with an auxin, which is substantially non-volatile at normal temperatures, at a time substantially in advance of the period when the buds would normally be expected to open so as to prevent abscission of the buds.

6. A method of preventing abscission of leaves comprising treating plants with an auxin, which is substantially non-volatile at normal temperatures, at a time substantially in advance of the period when the leaves would normally be expected to drop so as to prevent abscission of the leaves.

7. A method of preventing abscission of fruit comprising treating plants with an auxin, which is substantially non-volatile at normal temperatures, at a time substantially in advance of the period when the fruit would normally be expected to drop so as to prevent abscission of the fruit.

8. A method of preventing abscission of buds comprising treating plants with an auxin at a time substantially in advance of the period when the buds would normally be expected to open so as to prevent abscission of the buds.

9. A method of preventing abscission of leaves comprising treating plants with an auxin at a time substantially in advance of the period when the leaves would normally be expected to drop so as to prevent abscission of the leaves.

10. A method of preventing abscission of fruit comprising treating plants with an auxin at a time substantially in advance of the period when the fruit would normally be expected to drop so as to prevent abscission of the fruit.

GEORGE S. AVERY, Jr.